(12) United States Patent
Laurila et al.

(10) Patent No.: US 12,387,542 B2
(45) Date of Patent: Aug. 12, 2025

(54) MOVABLE USER ENTRY DEVICE AND AN ACCESS SYSTEM FOR ACCESS CONTROL

(71) Applicant: KONE Corporation, Helsinki (FI)

(72) Inventors: Jussi Laurila, Helsinki (FI); Visa Rauta, Helsinki (FI); Antti Perko, Helsinki (FI); Mika Kemppainen, Helsinki (FI); Tomio Pihkala, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 18/142,855

(22) Filed: May 3, 2023

(65) Prior Publication Data

US 2023/0306804 A1 Sep. 28, 2023

Related U.S. Application Data

(63) Continuation of application No. PCT/FI2020/050816, filed on Dec. 4, 2020.

(51) Int. Cl.
*G07C 9/10* (2020.01)
*G07C 9/00* (2020.01)
*G07C 9/25* (2020.01)
*H04W 4/33* (2018.01)

(52) U.S. Cl.
CPC ........... *G07C 9/10* (2020.01); *G07C 9/00309* (2013.01); *G07C 9/257* (2020.01); *H04W 4/33* (2018.02)

(58) Field of Classification Search
CPC .......... G07C 9/10; G07C 9/257; G07C 5/085; G07C 9/20; G07C 9/00; G07C 2009/00984; G07C 2009/00642

USPC .................................................. 235/93, 492
See application file for complete search history.

(56) References Cited

U.S. PATENT DOCUMENTS

| | | | |
|---|---|---|---|
| 3,374,872 A | 3/1968 | Guillerm | |
| 2003/0067541 A1* | 4/2003 | Joao | B60R 25/102 348/148 |
| 2007/0061487 A1* | 3/2007 | Moore | G06F 16/27 707/E17.032 |
| 2010/0088032 A1* | 4/2010 | Nielsen | G01C 15/06 702/5 |
| 2010/0188245 A1* | 7/2010 | Nielsen | G01V 3/15 340/686.1 |

(Continued)

FOREIGN PATENT DOCUMENTS

| | | |
|---|---|---|
| DE | 10 2007 053 751 A1 | 5/2009 |
| EP | 3 705 681 A1 | 9/2020 |

(Continued)

OTHER PUBLICATIONS

International Search Report (PCT/ISA/210) issued in PCT/FI2020/050816 mailed on Aug. 26, 2021.

(Continued)

*Primary Examiner* — Daniel St Cyr
(74) *Attorney, Agent, or Firm* — Birch, Stewart, Kolasch & Birch, LLP

(57) ABSTRACT

A movable user entry device for an access control includes an internal power source and a communication unit configured to wirelessly connect the user entry device to an external system. An access system for an access control includes an external system and at least one movable user entry device.

17 Claims, 4 Drawing Sheets

(56) References Cited

U.S. PATENT DOCUMENTS

2017/0372544 A1   12/2017   Schlechter et al.
2022/0169207 A1*  6/2022   Moeller ................ B60R 25/245

FOREIGN PATENT DOCUMENTS

WO   WO 2008/124236 A1   10/2008
WO   WO 2012/052808 A1   4/2012

OTHER PUBLICATIONS

Written Opinion (PCT/ISA/237) issued in PCT/FI2020/050816 mailed on Aug. 26, 2021.

* cited by examiner

MOVABLE USER ENTRY DEVICE AND AN ACCESS SYSTEM FOR ACCESS CONTROL

CROSS REFERENCE TO RELATED APPLICATIONS

This application is a Continuation of PCT International Application No. PCT/FI2020/050816, filed on Dec. 4, 2020, which is hereby expressly incorporated by reference into the present application.

TECHNICAL FIELD

The invention concerns in general the technical field of access control. Especially the invention concerns user entry devices for access control.

BACKGROUND

Typically, buildings and/or elevators may comprise an access control system for controlling access of users into the building and/or into at least one elevator car of the elevator. Typically, the access control system of the building or elevator comprises at least one user entry device, e.g. a gate device, for providing access only for authorized users, i.e. identified users with an access, via the at least one gate device. The at least one gate device is fixedly installed to a desired location.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a movable user entry device and an access system for access control. Another objective of the invention is that the movable user entry device and the access system for access control enable substantially free placement of the movable user entry device.

The objectives of the invention are reached by a movable user entry device and an access system as defined by the respective independent claims.

According to a first aspect, a movable user entry device for an access control is provided, wherein the movable user entry device comprises: an internal power source, and a communication unit configured to wirelessly connect the user entry device to an external system.

The movable user entry device may further comprise an internal access database comprising access control related data and/or the movable user entry device may be configured to obtain the access control related data from an external access database.

The access control related data may be updated after the user entry device is moved.

The wireless connection between the user entry device and the external system may be based on at least one of the following wireless communication technologies: a wireless local area network (WLAN), a wireless personal area network (PAN), and/or a cellular network.

The movable user entry device may be configured to perform a pairing procedure with the external system to provide the wireless connection, when the wireless connection is based on the wireless personal area network.

Alternatively or in addition, the wireless connection between the user entry device and the external system may be implemented via a cloud server.

The movable user entry device may be configured to: determine location data representing a current location of the user entry device, obtain the location data from the external system, and/or obtain the location data as a user input.

The determination of the location data may be based on a wireless indoor positioning technology.

Alternatively or in addition, the movable user entry device may further comprise a motor configured to move the user entry device.

Moreover, the movable user entry device may further comprise a remote-control unit configured to remotely control the movement of the user entry device.

Alternatively or in addition, the movable user entry device may further comprise at least one imaging device configured to obtain temperature data of users accessing via the user entry device.

Alternatively or in addition, the movable user entry device may further comprise at least one imaging device configured to obtain identification data for facial recognition-based access control via the user entry device.

The user entry device may be a physical gate device or a sensor-based user entry device.

The external system may be at least one of an elevator system, an escalator system, an access control system, and a building related system.

According to a second aspect, an access system for an access control is provided, wherein the access system comprises: an external system and at least one movable user entry device as described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
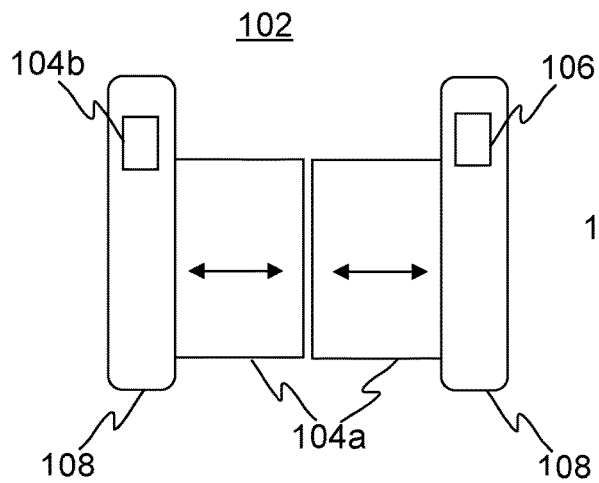
FIGS. 1A and 1B illustrate schematically examples of a movable user entry device according to the invention.
Figure 1B:
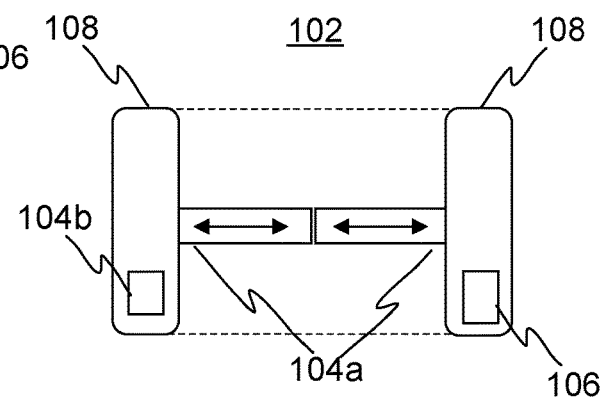

FIGS. 1A and 1B illustrate schematically an example of a movable user entry device 102 according to the invention. FIG. 1A illustrates a front view of the example movable user entry device 102. FIG. 1B illustrates a top view of the example movable user entry device 102, i.e. a view from above the movable user entry device 102. The movable user entry device 102 may refer to any point of access, e.g. a passage, through which a user has to pass through and in which a user access may be restricted depending on whether the user is identified or not and whether the identified user has an access via the user entry device 102 or not. The movable user entry device 102 may be used for access control for allowing access only for authorized users, i.e. identified users with an access, via the movable entry device 102 as will be described later in this application. From now on throughout this application the term "user entry device" is used for the movable user entry device 102, and the user entry device 102 discussed throughout this application is movable. The user entry device 102 may be a physical gate device, e.g. a turnstile, an access gate, or a security gate; or a sensor-based user entry device. In the example of FIGS. 1A and 1B the user entry device 102 is a physical gate device, e.g. a turnstile.

The physical gate device may comprise a frame structure 108 forming a passage for the users to access via the user entry device 102. The frame structure 108 may comprise e.g. two vertical structures, e.g. columns, as illustrated in the example of FIGS. 1A and 1B. The sensor-based user entry device does not comprise a physical frame forming the passage for the users to access via the user entry device 102, but the passage may be formed by one or more entities of the user entry device 102, e.g. by arranging the one or more entities of the user entry device 102 to an existing structure, e.g. to a door frame, any other frame, and/or a ceiling.

The user entry device 102 may comprise one or more gate related devices for the access control. At least some of the one or more gate related devices of the user entry device 102 will be discussed next.

The user entry device 102 may comprise at least one restriction device 104a, 104b configured to restrict access via the user entry device 102. The at least one restriction device 104a, 104b may comprise at least one physical restriction device 104a configured to provide a physical access restriction for an unidentified user and/or an identified user without an access via the user entry device 102. Some non-limiting examples of the at least one physical restriction device may comprise, a door, a panel, a barrier, etc. Alternatively or in addition, the at least one restriction device 104a, 104b may comprise at least one alert device 104b configured to provide an alert indicating an unidentified user and/or an identified user without an access via the user entry device 102. The alert may be a visual and/or audible alert. In the example of FIGS. 1A and 1B the at least one restriction device 104a, 104b comprises a physical restriction device, i.e. doors, 104a configured to provide the physical restriction and an alert device 104b configured to provide the visual and/or audible alert.

The user entry device 102 may further comprise at least one user identification device 106 configured to provide identification data for an access control via access control device 102. The obtained identification data may be provided to a control unit 500 of the user entry device 102 (for sake of clarity the control unit 500 is not shown in FIGS. 1A and 1B), which may be configured to define whether a user is allowed to access the user entry device 102 or not based on the obtained identification data and prestored access control related data. The obtained identification data may be compared to the prestored access control related data in order to identify the user. The access control related data may further comprise data relating to the identified users having the access via the user entry device 102 in order to determine the identified users with the access via the user entry device 102 and the identified users without the access via the user entry device 102. In other words, the control unit 500 of the user entry device 102 may be configured to define whether the identification data relates to an identified user with an access via a user entry device 102, an identified user without an access via the user entry device 102, or an unidentified user. The at least one user identification device 106 may comprise at least one of biometric identification device(s), optical identification device(s) (e.g. at least one imaging device 570 as will be describe later), radio frequency based identification device(s), and magnetic identification device(s) or any other type of user identification device(s).

The user entry device 102 may be configured to allow only the access of the identified users with an access via the user entry device 102. The user entry device 102 may be configured to be by default at a state allowing an unrestricted access via the user entry device 102. In other words, the user entry device 102 may be maintained at the state allowing the unrestricted access via the user entry device 102 and if the identification data relates to an unidentified user and/or a user without an access via the user entry device 102, the control unit 500 of the access control device 102 may be configured to control the at least one restriction device 104a, 104b to prevent, i.e. restrict, the access via the user entry device 102, e.g. by closing the at least one physical restriction device 104a and/or providing an alert via the at least one alert device 104b, wherein the alert indicates a restricted access. Alternatively, the user entry device 102 may be by default at a state preventing, i.e. restricting, the access of the users via the user entry device 102. In other words, the user entry device 102 may be maintained in a closed state and if the identification data relates to an identified user with an access via the user entry device 102, the control unit 500 of the user entry device 102 may be configured to control the at least one restriction device 104a, 104b to provide the access via the user entry device 102 e.g. by opening the at least one physical restriction device 104a and/or providing an alert via the at least one alert device 104b, wherein the alert indicates an allowed access.

In addition to the one or more gate related devices, the user entry device 102 according to the invention further comprises at least one internal power source 550 and a communication unit 530 (for sake of clarity the internal power source 550 and the communication unit 530 are not shown in FIGS. 1A and 1B). The at least one internal power source 550 may be configured to power one or more entities, devices, and/or units of the user entry device 102. The at least one internal power source 550 may comprise, e.g. at least one battery and/or at least one fuel cell. Preferably, the at least one internal power source 550 may be rechargeable. The user entry device 102 may further comprise one or more further entities or units. At least some of the one or more further entities, devices and/or units will be described later in this application.

Figure 2A:
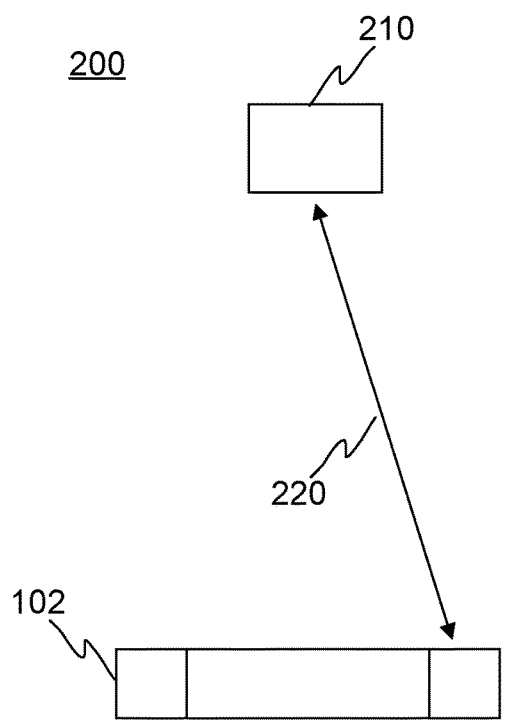
FIGS. 2A-2C illustrate schematically examples of an access system according to the invention.
Figure 2B:
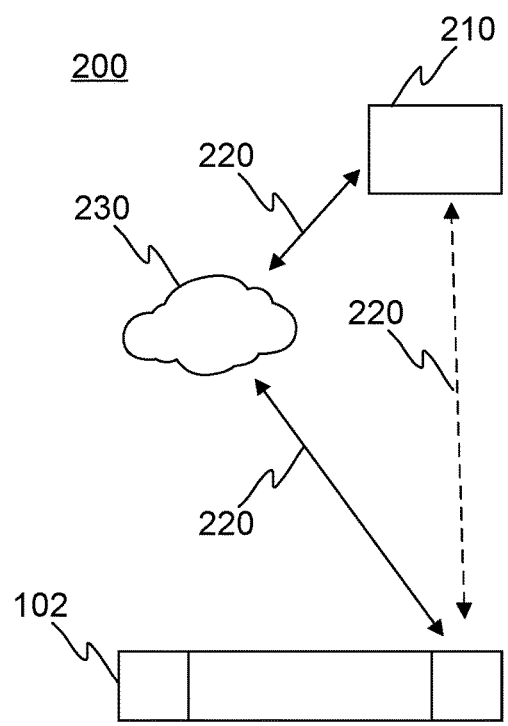

FIG. 2A illustrates schematically an example of an access system 200 according to the invention. The access system 200 comprises an external system 210 and at least one user entry device 102 according to the invention. The communication unit 530 of the user entry device 102 is configured to wirelessly connect 220 the user entry device 102 to the external system 210. The wireless connection 220 enables at least data transfer between the user entry device 102 and the external system 210. The external system 210 may be at least one of an elevator system, an escalator system, an access control system, and a building related system. The implementation of the external system 210 may be done as a stand-alone entity or as a distributed environment between a plurality of stand-alone entities, such as a plurality of servers providing distributed resource. Alternatively or in addition, the implementation of the entities of the external system 210 may be done as local entities and/or cloudbased entities. The wireless connection 220 between the user entry device 102 and the external system 210 may be based on at least one of the following wireless communication technologies: a wireless local area network (WLAN), e.g. Wi-Fi; a wireless personal area network (PAN), e.g. Bluetooth (BT), or Zigbee; a cellular network, e.g. 4G or 5G; and/or any other known wireless communication technologies. The wireless communication technologies may be divided e.g. in local wireless connection technologies (e.g. WLAN and/or PAN) and mobile wireless connection technologies (e.g. cellular networks). The communication unit 530 of the user entry device 102 may be configured to provide the wireless connection 220 by using at least one local wireless connection technology and/or at least one mobile wireless connection technology. Alternatively or in addition, the wireless connection 220 between the user entry device 102 and the external system 210 may be implemented via a cloud server 230. FIG. 2B illustrates an example of the access system 200, wherein the user entry device 102 may be wirelessly connected 220 to the external system 210 by using at least one wireless connection technology (i.e. a wireless connection 220 illustrated with the dashed arrow in FIG. 2B) and/or the user entry device 102 may be wirelessly connected 220 to the external system 210 via the cloud server 230 by using at least one wireless connection technology (i.e. a wireless connection 220 illustrated with the solid line arrows in FIG. 2B).

The wireless connection 220 to the external system 210 and the internal power source 550 enable the movability of the user entry device 102. The movability of the user entry device 102 and/or the movable user entry device 102 means that the physical location of the user entry device 102 may be freely defined and/or changed, i.e. relocated, from one location to another location, as long as the wireless connection 220 to the external system 210 may be provided, i.e. established. Thus, the physical location of the user entry device 102 is not fixed to any particular predefined location. The frame structure 108 of the user entry device 102 may preferably be substantially light to ease the movability of the user entry device 102. For example, materials of the different entities of the user entry device 102 and/or the frame structure 108, may be selected so that the frame structure 108 of the user entry device 102 may be substantially light. The movability of the user entry device 102 enables that the user entry device 102 may be substantially freely located and/or moved. This enables substantially free placement of the user entry device 102 into an environment, e.g. a building environment as long as the wireless connection 220 to the external system 210 may be provided, i.e. established. The user entry device 102 may even be located outside from a building as long as the wireless connection 220 to the external system 210 may be established. The user entry device 102 may be manually movable. Alternatively or in addition, the user entry device 102 may be motorized as will be described later in this application.

Figure 2C:
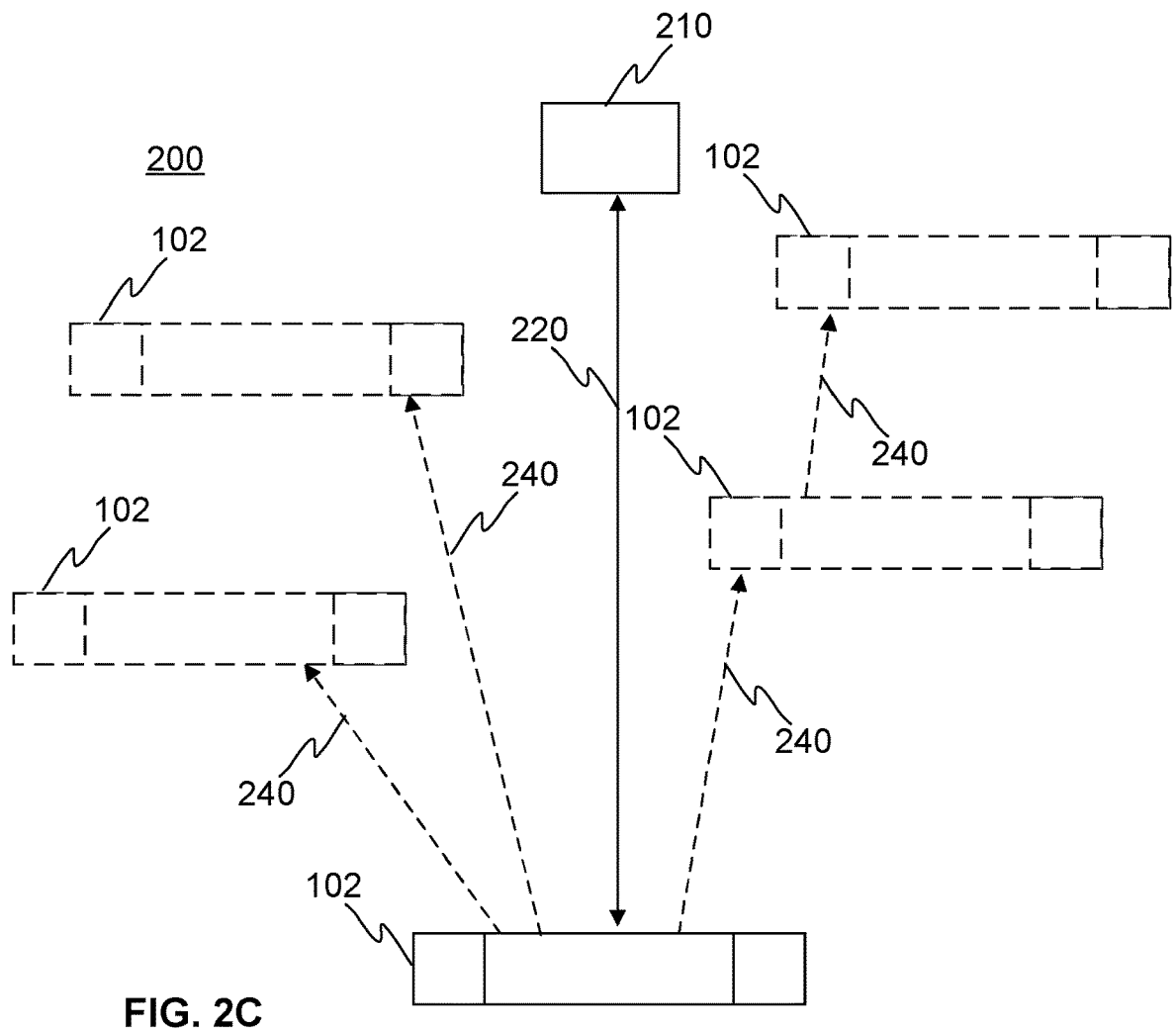

FIG. 2C illustrates schematically an example of the movability of the user entry device 102. In the example of FIG. 2C the movability of the at least one user entry device 102 is exemplified with one user entry device 102, but the invention is not limited to that and the access system 200 according to the invention may also comprise more than one user entry device 102, each user entry device 102 being movable. In the example of FIG. 2C dashed arrows 240 illustrate the movement of the user entry device 102 and dashed outlines of the user entry device 102 illustrate non-limiting example locations of the user entry device 102 after the movement.

Figure 3:
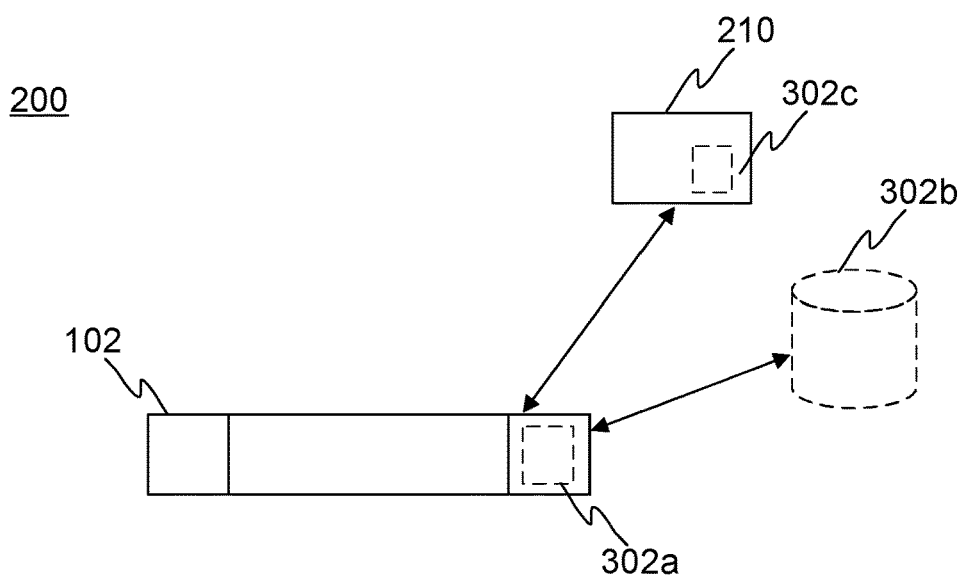
FIG. 3 illustrates schematically another example of an access system according to the invention.

According to an example embodiment of the invention, the user entry device 102 may comprise an internal, i.e. a local, access database 302a comprising the access control related data. Alternatively or in addition, the user entry device 102 may be configured to obtain the access control related data from an external access database 302b, 302c, e.g. a cloud database 302b a database 302c of the external system 210 and/or any other external database. The term "external access database" means throughout this application an access database residing external to the user entry device 102. The user entry device 102 may be wirelessly connected to the cloud database 302b to obtain the access control related data. FIG. 3 illustrates schematically an example of the access system 200 with example options for the access database 302a, 302b, 302c implementations. The access control related data may be updated after the user entry device 102 is moved to another location, i.e. is relocated. The updating of the access control related data enables that the identified users with access via the user entry device 102 may vary depending on the location of the user entry device 102. The update of the access control related data may be provided remotely via the wireless connection. Alternatively or in addition, the update of the access control related data may be provided locally, i.e. manually, by a user, e.g. building manger or operator, for example by inputting the updated access control related data to the user entry device 102 as a user input via a user interface 540 of the user entry device 102 and/or via a data storage device, e.g. a USB memory stick or any other data storage device.

For example, if the wireless connection 220 is based on the wireless local area network, the communication unit 530 of the user entry device 102 may be configured to provide the wireless connection 220 to the external system 210, e.g. an access point of the external system 210, when the communication unit 530 detects the wireless local area network of the external system 210. The wireless connection 220 based on the wireless local area network may be provided, when the user entry device 102 resides within a range of the wireless local area network of the external system 210.

Alternatively or in addition, for example when the wireless connection 220 is based on the wireless personal area network, e.g. Bluetooth, the user entry device 102 may be configured to perform a pairing procedure with the external system 210 to provide, i.e. establish, the wireless connection 220. The pairing procedure may be performed e.g. when the user entry device 102 is connected first time to the external system 210. In addition, the pairing procedure may be performed after the location of the user entry device 10 is changed, i.e. the user entry device 102 is moved to another location. The wireless connection 220 based on the wireless personal area network may be provided, when the user entry device 102 resides within a range of the personal area network of the external system 210. The pairing procedure between a user entry device 102 and the external system 210 may comprise transferring device data related to said user entry device 102 between the user entry device 102 and the external system 210. Each user entry device of the at least user entry device 102 may have a gate device specific, i.e. unique, identifier (ID). The device data may comprise for example the gate device specific ID; location data representing current physical location of the user entry device 102; distance data representing distance between the user entry device 102 and at least one predefined location; and/or any other device specific data. The pairing process between the user entry device 102 and the external system 210 may be performed, e.g. during powering up the user entry device 102, by transferring the device data from the user entry device 102 to the external unit 210 and linking the device specific ID of the user entry device 102 to the external unit 210 using the wireless connection 220. Alternatively or in addition, the pairing procedure between the user entry device 102 and the external system 210 may be performed manually by a user, e.g. building manger or operator, by entering, i.e. inputting, the device data related to said user entry device 102 to the user entry device 102 and/or to the external system 210.

According to an example embodiment of the invention, the user entry device 102 may be configured to determine location data representing a current (physical) location of the user entry device 102. The user entry device 102 may determine the location data e.g. based on a wireless indoor positioning technology. The wireless indoor positioning technology may for example be, but is not limited to, wireless local area network-based technology, e.g. Wi-Fi; Bluetooth Low Energy (BLE)-based technology, e.g. BLE beacons; or any other wireless indoor positioning technology. The user entry device 102 may further be configured to transfer the location data to the external system 210 so that the external system 210 is aware of the current location of the user entry device 102. The user entry device 102 may be configured to determine the location data each time, when the location of the user entry device 102 is changed, i.e. the user entry device 102 has been relocated or the location of the user entry device 102 has been moved.

Alternatively or in addition, according to an example embodiment of the invention, the user entry device 102 may be configured to obtain the location data from the external system 210 so that the user entry device 102 is aware of its current location. The external system 210 may be configured to determine the location data e.g. based on a wireless indoor positioning technology. The wireless indoor positioning technology may for example be, but is not limited to, wireless local area network-based technology, e.g. Wi-Fi; Bluetooth Low Energy (BLE)-based technology, e.g. BLE beacons; or any other wireless indoor positioning technology. The user entry device 102 may be configured to obtain the location data from the external system 210 each time, when the location of the user entry device 102 is changed, i.e. the user entry device 102 has been relocated or the location of the user entry device 102 has been moved.

Alternatively or in addition, according to an example embodiment of the invention, the user entry device 102 may be configured to obtain the location data manually, as a user input, e.g. by a building manger or operator, for example by inputting or entering the location data to the user entry device 102 via a user interface 540 of the user entry device 102 and/or via a data storage device, e.g. a USB memory stick or any other data storage device. The user entry device 102 may further be configured to transfer the location data to external system 210 so that the user entry device 102 is aware of the current location of the user entry device 102. The location data may be obtained manually each time, when the location of the user entry device 102 is changed, i.e. the user entry device 102 has been relocated or the location of the user entry device 102 has been moved.

The location data of the user entry device 102 determined and/or obtained according to one or more of the above discussed examples may be used e.g. in the updating of the access control related data after the user entry device 102 is moved to another location, i.e. is relocated. This enables that the access control related data corresponding to the current location of the user entry device 102 may be used, because as discussed above the identified users with access via the user entry device 102 may vary depending on the location of the user entry device 102.

Alternatively or in addition, according to an exemplifying embodiment of the invention, the user entry device 102 may be motorized, i.e. the user entry device 102 may comprise a motor 560, e.g. an electric motor, to move the user entry device 102. The user entry device 102 may further comprise wheels (for sake of clarity not shown in Figures). The motor 560 may be configured to move the user entry device 102 by powering the wheels. The wheels may be arranged under, i.e. below, the user entry device 102 to facilitate the movability of the at user entry device 102.

Figure 4:
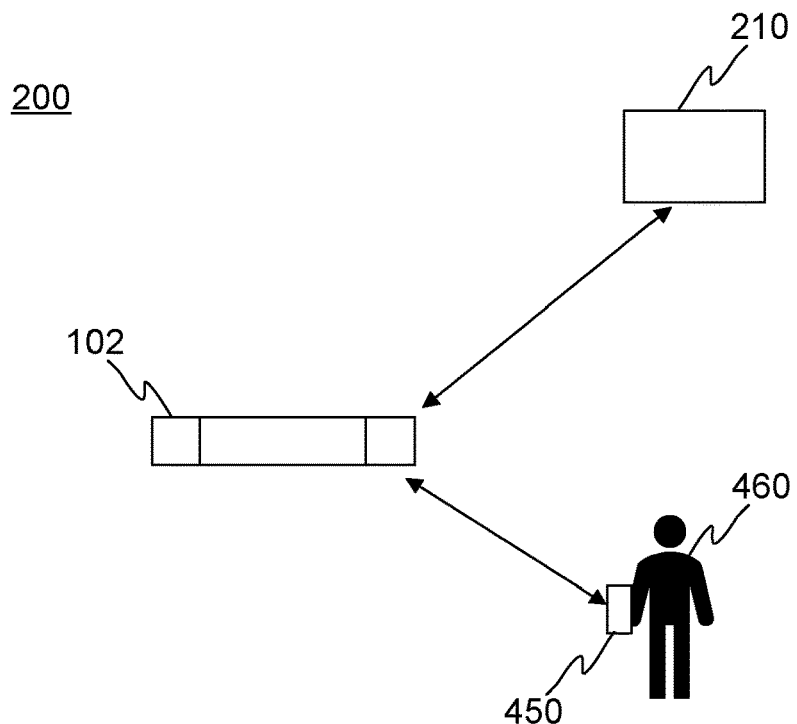
FIG. 4 illustrates schematically yet another example of an access system according to the invention.

According to an exemplifying embodiment of the invention, the user entry device 102 may further comprise a remote-control unit 450 for remotely control the movement and/or location of the user entry device 102. The remote-control unit 450 enables that the user entry device 102 may be remotely guided to a desired location. FIG. 4 illustrates schematically an example of the access system 200 according to the invention, wherein the user entry device 102 furthe comprises the remote-control unit 450. The remote-control unit 450 may comprise a user interface for receiving user input from a user 460 of the remote-control unit 450, e.g. a building manager or building operator. In response to receiving the user input via the user interface the remote-control unit 450 may be configured to control remotely the movement and/or location of the user entry device 102 by generating one or more control signals to the user entry device 102. The generated one or more control signals may comprise one or more instructions indicating the movement of the user entry device 102 and/or a new location of the user entry device 102. In response to receiving the one or more control signals from the remote-control unit 450 the user entry device 102 may be configured to control the motor 560 to move the user entry device 102. The remote-control unit 450 may be communicatively coupled to the user entry device 102. The communication between the remote-control unit 450 and the user entry device 102 may be based on one or more known wireless communication technologies, for example, but is not limited to, local area network, Bluetooth, or Application Programming Interface (API). Each user entry device 102 may comprise own dedicated remote control unit 450 to remotely control the movement and/or location of said user entry device 102 or one remote control unit 450 may be used to remotely control the movement and/or location two or more user entry devices 102, if the access system 200 comprises more than one user entry device 102.

Alternatively or in addition, according to an exemplifying embodiment of the invention the at least one user identification device 106 of the user entry device 102 may comprise at least one imaging device 570 configured to obtain identification data for facial recognition-based access control via the user entry device 102. The at least one imaging device 570 may be an internal device of the user entry device 102, e.g. integrated into the user entry device 102, or an external device arranged, e.g. mounted, to the user entry device 102. The obtained identification data may be provided to the control unit 108 of the user entry device 102, which is configured to define whether a user is allowed to access the user entry device 102 or not as discussed above.

Alternatively or in addition, according to an exemplifying embodiment of the invention, the user entry device 102 may comprise at least one imaging device 570 configured to obtain temperature data of users accessing via the user entry device 102. Preferably, the at least one imaging device 570 configured to obtain the temperature data may be the same at least one imaging device 570 configured to obtain the identification data. An abnormal temperature of a user may indicate that the user has, e.g. a virus, infection. In response to a detection of an abnormal temperature in the temperature data, the at user entry device 102 may be configured to provide a user feedback e.g. by means of the at least one alert device 104b, prevent the access of a possible infected user, e.g. by means of the at least one physical restriction device 104a, and/or generate an indication of a possibly infected user accessing via the user entry device 102 to the external system 210. The user feedback may be e.g. visual or audio feedback for the user to indicate the detection of the abnormal temperature of said user. The indication generated to the external system 210 may be used e.g. to inform the building manager or operator, and/or trace the possibly infected user. Alternatively or in addition, the temperature data obtained by the at least one imaging device 570 may be provided e.g. to health care authorities for gathering health data. The movability of the user entry device 102 enables that the user entry device 102 may be substantially quickly installed at a desired location to observe the temperature of people, e.g. during viral outbreaks. The at least one imaging device 570 configured to obtain the recognition data and/or temperature data may further be used to gather data to be used in optimization of a people flow.

Figure 5:
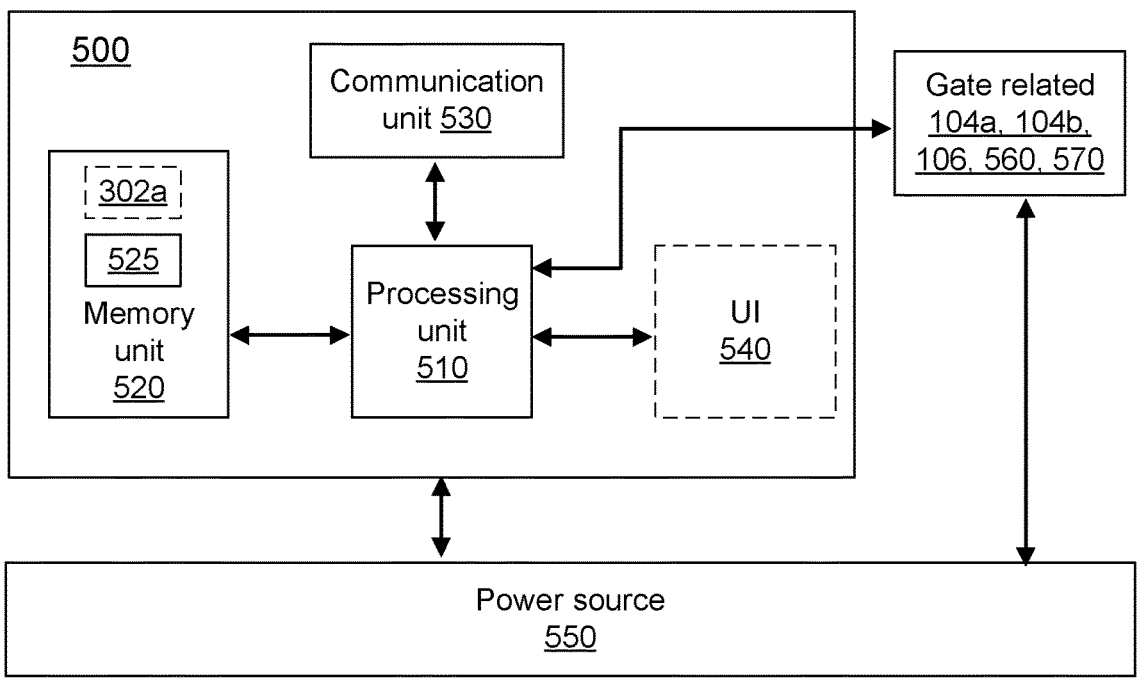
FIG. 5 illustrates schematically an example of components of a movable user entry device according to the invention.

FIG. 5 schematically illustrates an example of components of the user entry device 102 according to the invention. The user entry device 102 may comprise the control unit 500, the at least one internal power source 550, and the gate related devices as described above. The control unit 500 may comprise a processing unit 510 comprising one or more processors, a memory unit 520 comprising one or more memories, the communication unit 530 comprising one or more communication devices, and possibly a user interface (UI) unit 540. The gate related devices may comprise, but are not limited to, the motor 560, the at least one identification device 106, possibly the at least one imaging device 570, the at least one restriction device 104a, 104b, and/or any other gate related device. The memory unit 520 may store portions of computer program code 525 and any other data (e.g. the internal access database 302a), and the processing unit 510 may cause the user entry device 102 to operate as described by executing at least some portions of the computer program code 525 stored in the memory unit 520. The communication unit 530 may be based on at least one known wireless communication technologies, in order to exchange pieces of information as described earlier. The communication unit 530 provides an interface for communication with any external unit, such as the external system 210, the cloud server 230, the external access database 302b, 302c, the remote-control unit 450, and/or any other external systems/units. The communication unit 530 may comprise one or more communication devices, e.g. one or more radio transceivers, one or more antennas, etc. The user interface 540 may comprise I/O devices, such as buttons, keyboard, touch screen, microphone, loudspeaker, display and so on, for receiving user input and outputting information.

Figure 6:
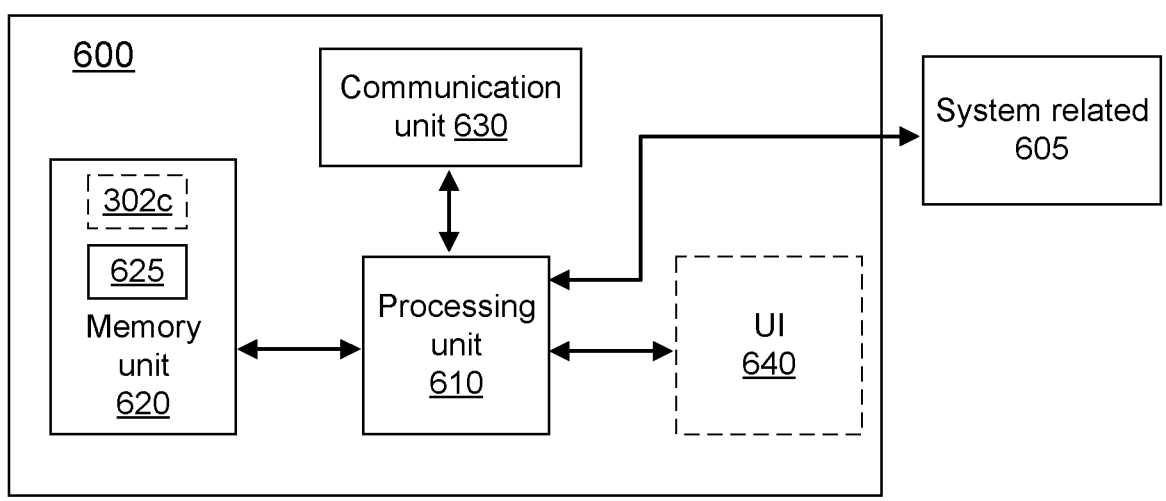
FIG. 6 schematically illustrates an example of components of an external system according to the invention.

FIG. 6 schematically illustrates an example of components of the external system 210 according to the invention. The external system 210 may comprise a control unit 600 and the system related devices 605. The control unit 600 may be configured to control at least partly the operation of the external system 210. For example, if the external system 210 is an elevator system, the control unit 600 may be an elevator control unit or an elevator control system. The control unit 600 may comprise a processing unit 610 comprising one or more processors, a memory unit 620 comprising one or more memories, the communication unit 630 comprising one or more communication devices, and possibly a user interface (UI) unit 640. The system related devices 605 may comprise, but are not limited to, one or more devices, entities, and/or systems related to the external system 210. For example, if the external system 210 is an elevator system, the system related devices 605 may comprise e.g. at least one elevator car arranged to travel along a respective at least one elevator shaft between a plurality of landings, a hoisting system, a safety circuit, an elevator door system, user interface devices, and/or any other elevator related devices and/or systems. The memory unit 620 may store portions of computer program code 625 and any other data (e.g. the external access database 302c), and the processing unit 610 may cause the external system 210 to operate as described by executing at least some portions of the computer program code 625 stored in the memory unit 620. The communication unit 630 may be based on at least one known wireless communication technologies, in order to exchange pieces of information as described earlier. The communication unit 630 provides an interface for communication with any external unit, such as the at least one user entry device 102, the cloud server 230, and/or any other external systems/units. The communication unit 630 may comprise one or more communication devices, e.g. one or more radio transceivers, one or more antennas, etc. The user interface 640 may comprise I/O devices, such as buttons, keyboard, touch screen, microphone, loudspeaker, display and so on, for receiving user input and outputting information.

At least some of the embodiments of the user entry device 102 and the access system 200 according to the invention as defined above enables that the at least one user entry device 102 may be substantially freely located. This in turn enables flexible layout of the environment, in which the user entry device 102 and/or the access system 200 according to the invention is implemented, e.g. the layout of an elevator lobby area. The layout of the environment may be adjusted based on current need. Alternatively or in addition, the location of the user entry device 102 may be adjusted based on current need. Alternatively or in addition, the user entry device 102 and/or the access system 200 according to the invention may be exploited in planning of a people flow, e.g. the people flow of a building or the elevator system, before determining the final location of the at least user entry device 102.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A movable user entry device for an access control, wherein the movable user entry device comprises:
   access control related data for identifying users having access via the movable user entry device, wherein the movable user entry device is configured to allow only access of the users identified by the access control related data via the movable user entry device;
   an internal power source; and
   a communication unit configured to wirelessly connect the user entry device to an external system,
   wherein the moveable use entry device is configured to:
      perform a pairing procedure by transferring a device data of the movable user entry device to an external system, and linking the device data of the movable user entry device to an access database of the external system;
      determine location data representing a current location of the movable user entry device;
      transfer the location data representing the current location of the user entry device to the external system; and
      update the access control related data after the user entry device is relocated from a previous location to the current location according to the linking of the movable user entry device with the access database of the external system and the determined location data, such that users that are identified by the updated access control related data to have access via the movable user entry device are associated with the new location of the movable user entry device, and after the access control related data is updated, the movable user entry device is configured to allow only access of the users identified by the updated access control related data via the movable user entry device.

2. The movable user entry device according to claim 1, further comprising an internal access database comprising the access control related data and/or the user entry device is configured to obtain the access control related data from an external access database.

3. The movable user entry device according to claim 2, wherein the wireless connection between the user entry device and the external system is implemented via a cloud server.

4. The movable user entry device according to claim 1, wherein the wireless connection between the user entry device and the external system is based on at least one of the following wireless communication technologies: a wireless local area network (WLAN), a wireless personal area network (PAN), and/or a cellular network.

5. The movable user entry device according to claim 4, configured to perform the pairing procedure with the external system to provide the wireless connection, when the wireless connection is based on the wireless personal area network.

6. The movable user entry device according to claim 4, wherein the wireless connection between the user entry device and the external system is implemented via a cloud server.

7. The movable user entry device according to claim 1, wherein the wireless connection between the user entry device and the external system is implemented via a cloud server.

8. The movable user entry device according to claim 1, configured to:
   determine location data representing a current location of the user entry device;
   obtain the location data from the external system; and/or obtain the location data as a user input.

9. The movable user entry device according to claim 8, wherein the determination of the location data is based on a wireless indoor positioning technology.

10. The movable user entry device according to claim 1, further comprising a motor configured to move the user entry device.

11. The movable user entry device according to claim 10, further comprising a remote-control unit configured to remotely control the movement of the user entry device.

12. The movable user entry device according to claim 1, further comprising at least one imaging device configured to obtain temperature data of users accessing via the user entry device.

13. The movable user entry device according to claim 1, further comprising at least one imaging device configured to obtain identification data for facial recognition-based access control via the user entry device.

14. The movable user entry device according to claim 1, wherein the user entry device is a physical gate device or a sensor-based user entry device.

15. The movable user entry device according to claim 1, wherein the external system is at least one of an elevator system, an escalator system, an access control system, and a building related system.

16. An access system for an access control, wherein the access system comprises:
   an external system; and
   at least one movable user entry device comprising:
      access control related data for identifying users having access via the at least one movable user entry device, wherein the at least one movable user entry device is configured to allow only access of the users identified by the access control related data via the at least one movable user entry device;
      an internal power source; and
      a communication unit configured to wirelessly connect the at least one moveable user entry device to an external system,
      wherein the at least one moveable use entry device is configured to:
         perform a pairing procedure by transferring a device data of the at least one movable user entry device to an external system, and linking the device data of the at least one movable user entry device to an access database of the external system;
         determine location data representing a current location of the at least one movable user entry device;
         transfer the location data representing the current location of the at least one movable user entry device to the external system; and
         update the access control related data after the at least one movable user entry device is relocated from a previous location to the current location according to the linking of the at least one movable user entry device with the access database of the external system and the determined location data, such that users that are identified by the updated access control related data to have access via the at least one movable user entry device are associated with the new location of the at least one movable user entry device, and after the access control related data is updated, the at least one movable user entry device is configured to allow only access of the users identified by the updated access control related data via the at least one movable user entry device.

17. The movable user entry device according to claim 2, wherein the wireless connection between the user entry device and the external system is based on at least one of the following wireless communication technologies: a wireless local area network (WLAN), a wireless personal area network (PAN), and/or a cellular network.

\* \* \* \* \*